United States Patent
Eliades et al.

(10) Patent No.: US 7,490,662 B2
(45) Date of Patent: Feb. 17, 2009

(54) INTEGRATED THERMAL BYPASS VALVE

(75) Inventors: Manos Eliades, Belleville, MI (U
 Loren J. Lohmeyer, III, Monroe, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 522 days.

(21) Appl. No.: 10/964,089

(22) Filed: Oct. 13, 2004

(65) Prior Publication Data

US 2006/0076129 A1  Apr. 13, 2006

(51) Int. Cl.
 *F28F 27/02* (2006.01)
(52) U.S. Cl. .............. 165/297; 165/298; 165/103; 165/176; 165/76; 165/41; 165/51; 236/34.5; 236/99 K; 123/41.1
(58) Field of Classification Search .......... 165/297, 165/298, 103, 176, 76, 41, 51; 236/99 K, 236/34.5; 123/41.1
 See application file for complete search history.

(56) References Cited

U.S. PATENT DOCUMENTS

| 2,007,590 | A |   | 7/1935  | Baillio |            |
|-----------|---|---|---------|---------|------------|
| 2,468,519 | A |   | 4/1949  | Shaw    |            |
| 2,469,212 | A |   | 5/1949  | Shaw    |            |
| 2,510,473 | A | * | 6/1950  | Jensen  | 236/34.5   |
| 3,034,770 | A | * | 5/1962  | Hiersch | 165/103    |
| 3,038,664 | A | * | 6/1962  | Gould   | 236/93 R   |
| 3,578,948 | A | * | 5/1971  | Friend et al. | 219/230 |
| 3,630,175 | A |   | 12/1971 | Reid, Jr. et al. |     |
| 3,920,067 | A |   | 11/1975 | Schindler et al. |     |
| 4,086,956 | A |   | 5/1978  | Block et al. |        |
| 4,432,410 | A | * | 2/1984  | Cadars  | 165/296    |
| 4,575,003 | A | * | 3/1986  | Linker et al. | 165/41 |
| 4,593,749 | A |   | 6/1986  | Schatz  |            |
| 5,101,640 | A |   | 4/1992  | Fukushima et al. |     |
| 5,305,826 | A |   | 4/1994  | Couëtoux |           |
| 6,026,804 | A |   | 2/2000  | Schardt et al. |      |
| 6,471,133 | B1 | * | 10/2002 | O'Flynn et al. | 236/34.5 |
| 2002/0021742 | A1 |  | 2/2002 | Maskell et al. |     |
| 2003/0019620 | A1 |  | 1/2003 | Pinco et al. |       |

FOREIGN PATENT DOCUMENTS

EP  0079863  5/1983
GB  2090957  7/1982

* cited by examiner

*Primary Examiner*—John K Ford
(74) *Attorney, Agent, or Firm*—Brinks Hofer Gilson & Lione

(57) ABSTRACT

A heat exchanger including an inlet port, an outlet port, a header, a plurality of cooling tubes, and a thermal bypass valve integrated therein. The thermal bypass valve is located in the header and is configured to restrict the flow of fluid through the cooling tubes of the heat exchanger below a target fluid temperature. The thermal bypass valve includes a valve body that is movable between first and second operational modes to restrict and not restrict the flow of fluid.

20 Claims, 3 Drawing Sheets

INTEGRATED THERMAL BYPASS VALVE

BACKGROUND

1. Field of the Invention

The present invention generally relates to heat exchangers. More specifically, the invention relates to a heat exchanger having a thermal bypass valve associated therewith.

2. Description of Related Art

Heat exchangers in automotive applications need to operate in a wide range of environmental conditions. For heat exchangers, such as oil coolers, performance conditions arise, such as cold temperatures, that dictate the need for a thermal bypass valve associated with the oil cooler. Typically, thermal bypass valves are installed between transport hoses or jumper lines separate from the heat exchanger. More recently, thermal bypass valves have been attached to the outside of the heat exchanger via an external block housing.

The process, material and labor costs to install the bypass valve in hoses or jumper lines are significant. In addition, current mounting of a thermal bypass valve between the hoses or mounted external to the heat exchanger requires a significant amount of space. With today's tight underhood packaging environments, the extra space to package the thermal bypass valve presents a great concern. Further, reliability and serviceability issues dictate an improved design would be desirable.

In view of the above, it is apparent that there exists a need for an improved design for accommodating a thermal bypass valve.

SUMMARY

In satisfying the above need, as well as overcoming the enumerated drawbacks and other limitations of the related art, the present invention provides a heat exchanger including an integrated thermal bypass valve.

The heat exchanger includes an inlet and an outlet port, a manifold, a plurality of cooling tubes, and a thermal bypass valve. The manifold is in fluid communication with the inlet port and the plurality of cooling tubes. The thermal bypass valve is located in the manifold and configured to provide a flow path through a sleeve between the inlet and outlet port below a target fluid temperature bypassing the cooling tubes. A valve body cooperates with the sleeve of the thermal bypass valve to direct the fluid through the cooling tubes above the target fluid temperature.

In another aspect of the present invention, the valve body is movable in a direction perpendicular to the cooling tubes such that the flow of fluid is restricted.

In another aspect of the present invention, the sleeve is attached to the manifold and a spring clip retains the valve body in the sleeve such that removing the clip allows the valve body and spring to be freely removed from the sleeve.

In another aspect of the present invention, the heat exchanger includes a return tube in communication with the cooling tubes and the manifold. Further, a baffle is located in the manifold separating the cooling tubes and the return tube.

In yet another aspect of the present invention, the sleeve is press fit into the manifold and the inlet port extends through the manifold into the sleeve.

Further objects, features and advantages of this invention will become readily apparent to persons skilled in the art after a review of the following description, with reference to the drawings and claims that are appended to and form a part of this specification.

DETAILED DESCRIPTION

Figure 1:
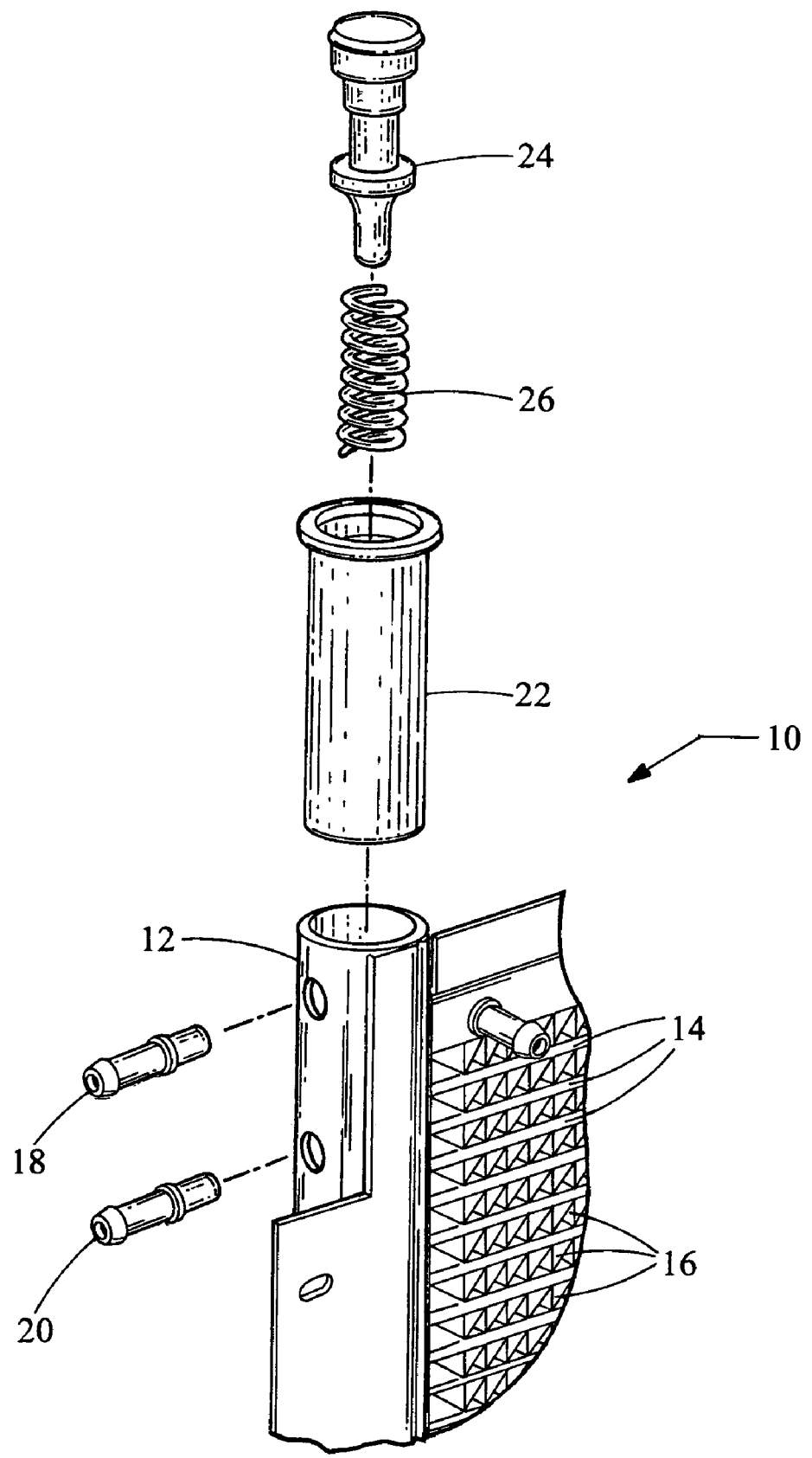
FIG. 1 is an isometric view of a heat exchanger with an integrated thermal bypass valve in accordance with the present invention.

Referring now to FIG. 1, a heat exchanger embodying the principles of the present invention is illustrated therein and designated at 10. As its primary components, the heat exchanger 10 includes a pair of headers (only one of which is shown in the drawings and designated at 12) between which extend a series of cooling tubes 12. Also provided in one of the headers 12 are an inlet port 20, an outlet port 18, and a thermal bypass valve 21. The inlet port 20 is connected to the manifold 12 and allows the flow of fluid, such as transmission oil or engine coolant, into the manifold 12. From the header 12, the fluid is circulated through the tubes 14 where it is cooled. Fins 16 are connected to the cooling tubes 14 to provide increased thermal dissipation, through convection, from the cooling tubes 14. The cooled fluid is collected in the other header and returned to the manifold 12 by a return tube 27. The cooled fluid then exits the manifold 12 through the output port 18.

The thermal bypass valve 21 is inserted into the manifold 12 and diverts at least a portion of the flow of fluid around the heat exchanger 10 if the fluid temperature is below a target temperature. The thermal bypass valve 21 includes a sleeve 22, a valve body 24, and a spring 26. The sleeve 22 is initially press fit into the manifold 12, then the inlet port 20 and outlet port 18 are inserted through the manifold 12 into the sleeve 22. The inlet and outlet port 20, 18 secure the sleeve 22 inside the manifold 12 and maintain orientation of the sleeve 22 within the manifold 12. The sleeve 22 may also be brazed or otherwise mechanically bonded, or mechanically fastened within the manifold 12. The spring 26 and valve body 24 are inserted into the sleeve 22 and act to direct the flow of fluid through the heat exchanger below a target temperature.

Figure 2:
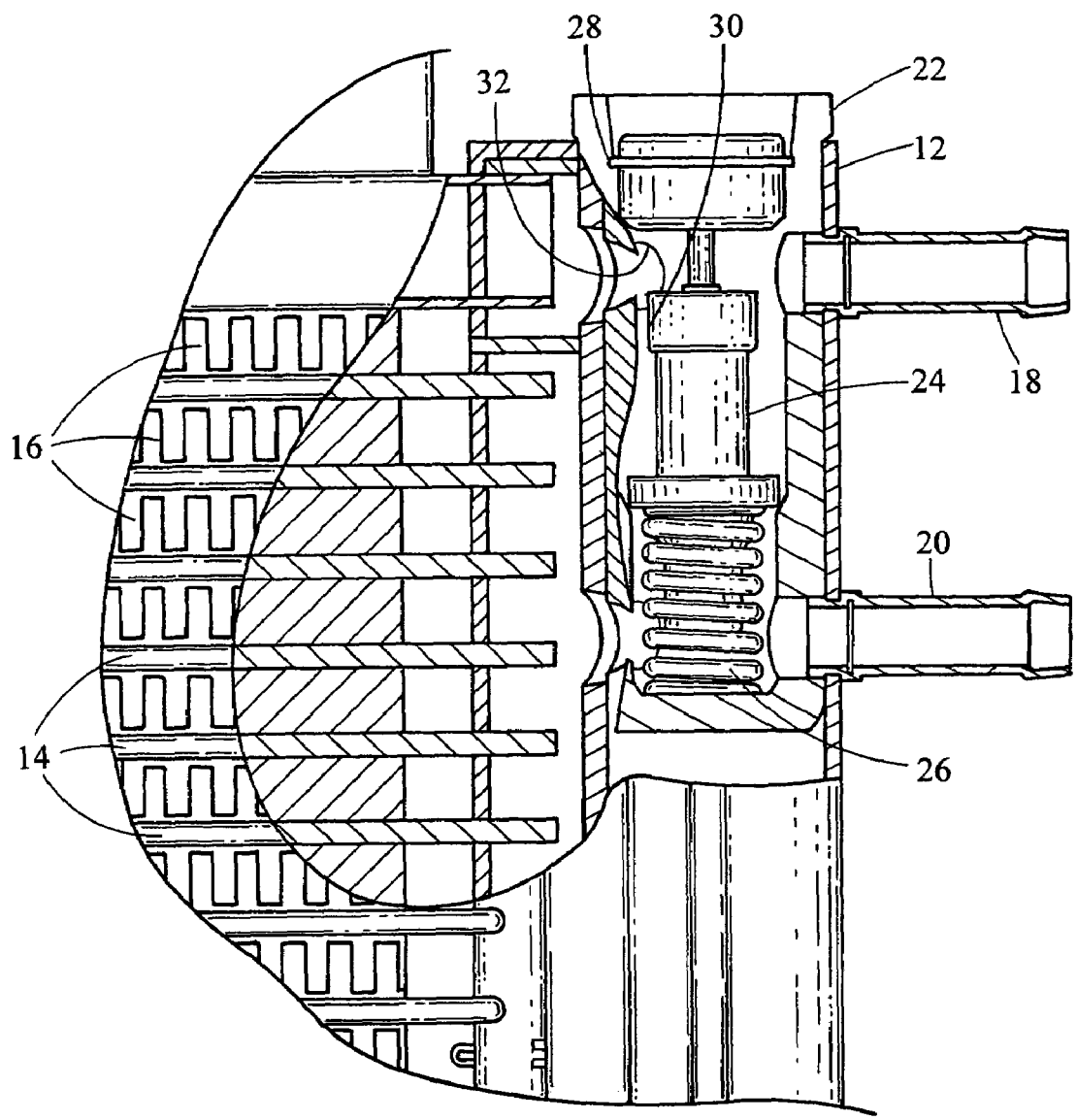
FIG. 2 is a sectional side view of a heat exchanger with an integrated thermal bypass valve in the closed position.

Now referring to FIG. 2, the bypass valve 21 is shown mounted within the manifold 12 and is depicted in bypass mode. The spring 26 is biased between the sleeve 22 and the valve body 24. A clip 28, such as a spring clip, is used to retain the valve body 24 and the spring 26 within the sleeve 22. In bypass mode, a flow path is created through the sleeve 22 between the inlet port 20 and outlet port 18. As such, the flow of fluid through the cooling tubes 14 is inherently restricted, as the fluid resistance through the cooling tubes 14 is higher than the fluid resistance through the sleeve 22, between the inlet and outlet ports 18, 20. Therefore, at least a portion, and in this embodiment substantially all, of the fluid is diverted from the inlet port 20 to the outlet port 18 without passing through the cooling tubes 14.

Figure 3:
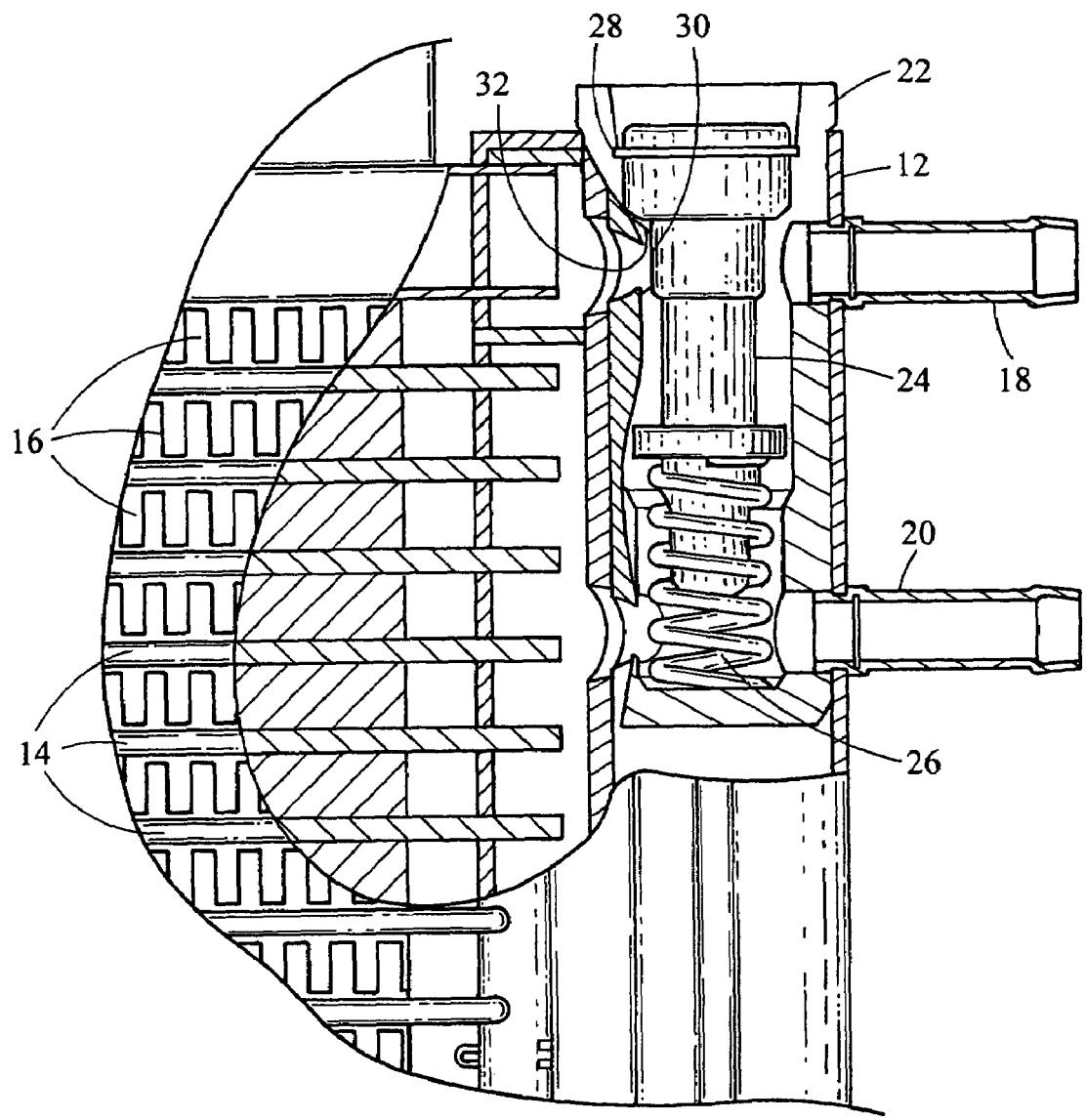
FIG. 3 is a sectional side view of a heat exchanger with an integrated thermal bypass valve in the open position.

Now referring to FIG. 3, the thermal bypass valve 21 is shown with the thermal bypass valve 21 in a hot flow mode. As the temperature of the fluid increases, a wax motor in the valve body 24 expands pushing the valve body 24 against the spring 26 until a surface of the valve body 24 cooperates with a surface of the sleeve 22 to close fluid path from the input port 20 to the output port 18 through the sleeve 22. Therefore, as the fluid temperature increases such that use of the heat exchanger is required, the hot fluid is directed to flow through the heat exchanger, being cooled as it moves through the cooling tubes 14. The cooled fluid returns through the return tube 27 and back out the outlet port 18 for reuse. It is also to be noted that the baffle 34 isolates the the cooling tubes 14 from the return tube 27, such that, the fluid must flow from the input port 20 through the cooling tubes 14 back through the return tube 27, and out the outlet port 18.

Further, it is to be noted that the orientation of the thermal bypass valve 21 provides that the length of the valve body 24, as well as, the travel direction of the valve body 24 is perpendicular to the cooling tubes 14. By orienting the valve body 24 transverse to the cooling tubes 14, a very compact and tightly integrated package is formed such that the minimum amount of external space is required to run hoses to and from the heat exchanger 10.

In addition, as the clip 28 is removed, the valve body 24 and the spring 26 are readily accessible and removable from the sleeve 22. Further, the sleeve 22 remains securely fastened within the manifold 12 in a consistent orientation. Further, none of the fluid connections to or from the heat exchanger 10 need be disconnected.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A heat exchanger for a vehicle, the heat exchanger comprising:
   an inlet and an outlet port for receiving a fluid flow;
   a manifold in fluid communication with the inlet port;
   a plurality of cooling tubes in fluid communication with the manifold;
   a thermal bypass valve located in the manifold and including a valve body and a sleeve, the sleeve being separately formed from the manifold, the inlet port has a wall extending into the sleeve, the valve body being moveable between first and second positions, the valve body being configured in the first position to divert at least a portion of the fluid flow from the inlet port to the outlet port through the sleeve without passing the at least a portion of the fluid flow through the cooling tubes, and in the second position the valve body being moved in a direction generally perpendicular to the cooling tubes such that a surface of the valve body cooperates with the sleeve to restrict flow through the sleeve between the inlet and outlet ports and the fluid flow is directed from the inlet port to the outlet port through the cooling tubes.

2. The heat exchanger according to claim 1, wherein the sleeve is attached to the manifold.

3. The heat exchanger according to claim 2, further comprising a removable retainer that retains the valve body such that removing the retainer allows the valve body to be freely removed from the sleeve.

4. The heat exchanger according to claim 1, further comprising a return tube in fluid communication between the cooling tubes and the manifold.

5. The heat exchanger according to claim 4, further comprising a baffle located in the manifold between the cooling tubes and the return tube.

6. The heat exchanger according to claim 1, wherein the sleeve extends from the inlet port to the outlet port.

7. The heat exchanger according to claim 1, wherein the sleeve is mechanically bonded to the manifold.

8. A heat exchanger for a vehicle, the heat exchanger comprising:
   an inlet and an outlet port for receiving a fluid flow;
   a manifold in fluid communication with the inlet port;
   a plurality of cooling tubes in fluid communication with the manifold;
   a thermal bypass valve located in the manifold and including a valve body and a sleeve, the sleeve being separately formed from the manifold, the inlet port has a wall extending into the sleeve, the valve body being moveable between first and second positions, the valve body being configured in the first position to divert at least a portion of the fluid flow from the inlet port to the outlet port through the sleeve without passing the at least a portion of the fluid flow through the cooling tubes, and in the second position the valve body being moved in a direction generally perpendicular to the cooling tubes such that the fluid flow is directed from the inlet port to the outlet port through the cooling tubes.

9. The heat exchanger according to claim 8, wherein the sleeve is attached to the manifold.

10. The heat exchanger according to claim 9, further comprising a removable retainer that retains the valve body such that removing the retainer allows the valve body to be freely removed from the sleeve.

11. The heat exchanger according to claim 8, further comprising a return tube in fluid communication between the cooling tubes and the manifold.

12. The heat exchanger according to claim 11, further comprising a baffle located in the manifold between the cooling tubes and the return tube.

13. The heat exchanger according to claim 8, wherein the sleeve extends from the inlet port to the outlet port.

14. The heat exchanger according to claim 8, wherein the sleeve is mechanically bonded to the manifold.

15. A heat exchanger for a vehicle, the heat exchanger comprising:
   an inlet and an outlet port for receiving a fluid flow;
   a manifold being fluid communication with the inlet port and outlet ports;
   a plurality of cooling tubes in fluid communication with the manifold;
   a thermal bypass valve located in the manifold and including a valve body and a sleeve, the sleeve being separately formed from the manifold, each of the inlet port and the outlet port has a wall extending into the sleeve, the sleeve being connected to and in fluid communication with the inlet port and outlet ports, where the sleeve extends from the inlet port to the outlet port, the inlet and outlet ports being generally perpendicular to the valve body; the valve body being located within the sleeve and moveable between first and second positions, the valve body being configured in the first position to divert at least a portion of the fluid flow from the inlet port to the outlet port through the sleeve without passing the at least a portion of the fluid flow through the cooling tubes, and in the second position the valve body being moved in a direction generally perpendicular to the cooling tubes such that a surface of the valve body cooperates with the sleeve to restrict flow through the sleeve between the inlet and outlet ports and the fluid flow is directed from the inlet port to the outlet port through the cooling tubes.

16. The heat exchanger according to claim 15, further comprising a removable retainer that retains the valve body within the sleeve such that removing the retainer allows the valve body to be freely removed from the sleeve.

17. The heat exchanger according to claim 16, wherein the retainer is a spring clip.

18. The heat exchanger according to claim 15, further comprising a return tubs in fluid communication between the cooling tubes and the manifold.

19. The heat exchanger according to claim 15, wherein the valve body operates in the first position below a target fluid temperature and operates in the second position above the target fluid temperature.

20. The heat exchanger according to claim 15, wherein the sleeve is mechanically bonded to the manifold.

* * * * *

UNITED STATES PATENT AND TRADEMARK OFFICE
CERTIFICATE OF CORRECTION

PATENT NO. : 7,490,662 B2  Page 1 of 1
APPLICATION NO. : 10/964089
DATED : February 17, 2009
INVENTOR(S) : Manos Eliades et al.

It is certified that error appears in the above-identified patent and that said Letters Patent is hereby corrected as shown below:

On the Title Page

Item (75), after "Belleville, MI" replace "(U" with --(US)--.

In the Claims

In column 5, claim 18, line 8, after "comprising a return" replace "tubs" with --tube--.

Signed and Sealed this

Fourteenth Day of December, 2010

David J. Kappos
*Director of the United States Patent and Trademark Office*